(No Model.)
J. H. HUNTRESS.
HARNESS BUCKLE.
No. 271,465. Patented Jan. 30, 1883.
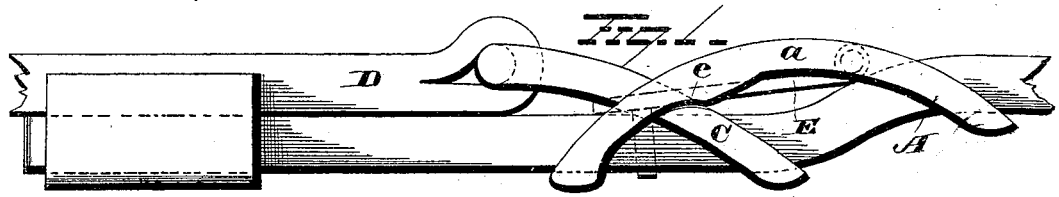
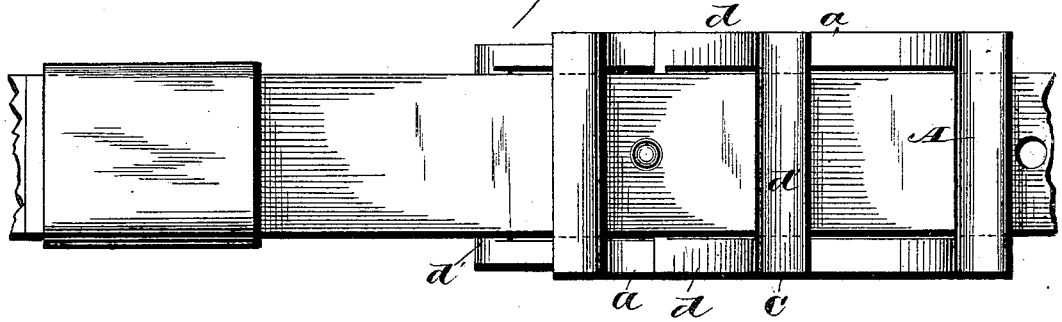
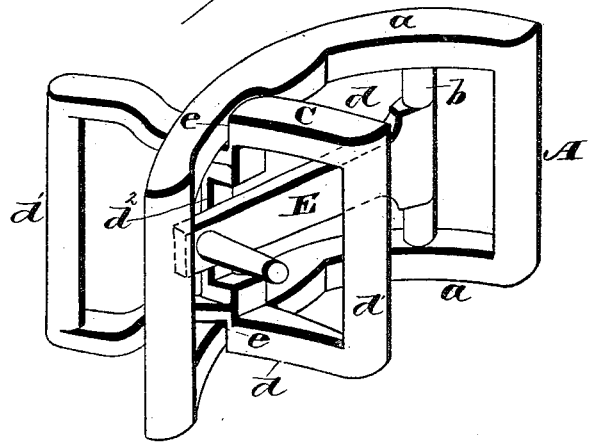
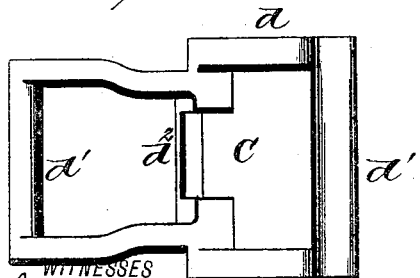
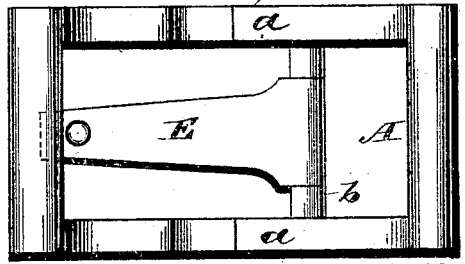
WITNESSES
S. G. Nottingham
J. F. Downing
INVENTOR
John H. Huntress,
By H. A. Symons.
Attorney

UNITED STATES PATENT OFFICE.

JOHN H. HUNTRESS, OF JANESVILLE, WIS., ASSIGNOR OF TWO-THIRDS TO CHARLES DUTTON AND HIRAM MERRILL, OF SAME PLACE.

HARNESS-BUCKLE.

SPECIFICATION forming part of Letters Patent No. 271,465, dated January 30, 1883.

Application filed October 13, 1882. (No model.)

*To all whom it may concern:*

Be it known that I, JOHN H. HUNTRESS, of Janesville, in the county of Rock and State of Wisconsin, have invented certain new and useful Improvements in Harness-Buckles; and I do hereby declare the following to be a full, clear, and exact description of the invention, such as will enable others skilled in the art to which it pertains to make and use the same.

My invention relates to an improvement in harness - buckles, and is designed as an improvement on Patent No. 206,179, granted to me July 23, 1878; and it consists in certain details of construction and combinations of parts, as will be more fully described, and pointed out in the claim.

In the accompanying drawings, Figure 1 is a plan view, showing my improvement in position on a harness-trace and hame-tug. Fig. 2 is a side elevation of the same. Fig. 3 is a detached perspective view of the two parts of the buckles, showing them in their proper relative position. Fig. 4 is a detached perspective view of the frame, and Fig. 5 is a similar view of the bail.

My improved buckle is composed of two parts—the frame A, through which the trace B passes, and the sliding bail C, one end of which latter is securely held in the hame-tug D.

The frame A is rectangular in shape, curved from end to end, as shown, and each side bar, *a*, of the same is thickened or enlarged about midway its length on its upper concaved surface, to form rests or stops for the bail while adjusting the buckle. The frame A is also provided with the cross-bar *b*, to which the tongue E is pivotally secured. This tongue E can be of any suitable length, and is provided near its outer free end, on its upper surface, with the upwardly-projecting lug, adapted to pass through a hole in the trace and assist in holding the parts in position.

The bail C consists of the side bars, *d*, end bars, *d'*, and central bar, $d^2$. The side bars, *d*, are cut away or curved inward, so as to enable the said side bars, *d*, of the said bail to rest between the side bars of the frame A. By curving the side bars inward or cutting them away, shoulders *e* are formed, which latter are adapted to bear on the upper concaved surface of the side bars of the frame and support or hold the said bail in position within the frame. The cross-bar $d^2$ of the bail C is cut away on its upper surface, as shown at *f*, for the reception of the tongue E, which latter rests on the cross-bar $d^2$, and is held thereby up in engagement with the trace.

When the parts are in their proper relative position, as shown in Fig. 3, the shoulders *e* of the bail rest on the side bars of the frame, in front of the rests, and the tongue E of the frame projects through the bail and rests on the cross-bar $d^2$, which latter holds it up in position.

When it is desired to adjust the buckle on a harness the bail is placed within the frame in the manner above described. The free end of the trace is then passed through the frame A, between the rear end thereof and the cross-bar *b*, and over the rear or pivoted end of the tongue E. The bail C is then turned, so as to assume a position nearly at right angles to the frame, with the shoulders *e* thereof resting on the side bars of the frame behind the enlarged or raised portions thereof. The end of the trace is then passed forward between the rear end bar of the bail and the cross-bar $d^2$, and from thence over the tongue and under the front end bar of the frame A. When the end of the trace has passed under the front bar of the frame the trace is adjusted to the proper length, and the projecting lug of the tongue is passed through the proper hole in the strap. As soon as strain is exerted on the tug and trace the bail is slid forward over the raised portion of the side bars of the frame and up the inclined plane in front of the said raised portion. When the parts are under strain the rear end bar of the bail rests between the end bars of the frame and bears on the outer face of the trace, and the cross-bar *e* bears against the under or inner side of the tongue E. The greater the strain on the trace and tug the tighter the parts are held together, and after the parts are once adjusted all danger of the trace slipping is prevented.

My improved buckle can be manufactured at a small initial cost, is durable and effective in use, and when applied to the harness presents a neat and finished appearance.

Having fully described my invention, what I claim as new, and desire to secure by Letters Patent, is—

The combination, with the frame of the buckle, the side bars of which are concaved on their outer faces, a cross-bar, a tongue pivotally secured to the cross-bar, and a lug formed integral on the outer face of the tongue, of a bail adapted to fit within the frame, and provided with shoulders adapted to rest on the concaved side bars of the frame, and a cross-bar adapted to bear against the inner face of the pivoted tongue and hold it up in position, substantially as set forth.

In testimony whereof I have signed this specification in the presence of two subscribing witnesses.

JOHN H. HUNTRESS.

Witnesses:
CLARENCE L. CLARK,
CHAS. DUTTON.